United States Patent
Ban et al.

(10) Patent No.: US 6,244,232 B1
(45) Date of Patent: Jun. 12, 2001

(54) AUTOMOTIVE HEATER APPARATUS

(75) Inventors: Takashi Ban; Shigeru Suzuki; Hidefumi Mori; Tatsuyuki Hoshino, all of Kariya; Toshio Morikawa, Toyota; Toshihiro Oshima, Nagoya, all of (JP)

(73) Assignees: Kabushiki Kaisha Toyoda Jidoshokki Seisakusho; Denso Corporation, both of Kariya (JP)

( * ) Notice: Subject to any disclaimer, the term of this patent is extended or adjusted under 35 U.S.C. 154(b) by 0 days.

(21) Appl. No.: 09/249,419

(22) Filed: Feb. 12, 1999

(30) Foreign Application Priority Data

Feb. 17, 1998 (JP) .................................. 10-035160
Jan. 12, 1999 (JP) .................................. 11-005363

(51) Int. Cl.<sup>7</sup> .................................................. F02N 17/02
(52) U.S. Cl. ......................... 123/142.5 R; 123/41.29; 237/11
(58) Field of Search .................. 123/142.5 R, 41.29; 237/11, 13

(56) References Cited

U.S. PATENT DOCUMENTS

| | | | |
|---|---|---|---|
| 4,935,689 | * | 6/1990 | Fujikawa et al. ............. 123/142.5 R |
| 4,993,377 | * | 2/1991 | Itakura ............................ 123/142.5 R |
| 5,251,588 | * | 10/1993 | Tsujii et al. .................... 123/142.5 R |
| 5,255,733 | * | 10/1993 | King ............................... 123/142.5 R |
| 5,901,780 | * | 5/1999 | Zeigler et al. ................. 123/142.5 R |
| 6,021,752 | * | 2/2000 | Wahle et al. ................... 123/142.5 R |
| 6,027,032 | | 2/2000 | Aoki et al. . |

FOREIGN PATENT DOCUMENTS 10-114212    5/1998  (JP) .

* cited by examiner

*Primary Examiner*—John Kwon
(74) *Attorney, Agent, or Firm*—Morgan & Finnegan, LLP

(57) ABSTRACT

A control apparatus and method for controlling an automotive heater apparatus. The heater apparatus includes a coolant circuit for cooling an engine, a coolant circulating through the circuit, a heat generator for transferring heat to the coolant, and a heater core for transferring heat from the coolant. The heat generator houses a viscous fluid and a rotor selectively connected to and disconnected from the engine by a clutch. The clutch connects the engine with the rotor to shear the viscous fluid and generate heat. When the rotating speed of the rotor exceeds a rotor speed limit, which varies in accordance with the detected coolant temperature, the clutch disconnects the rotor of the heat generator from the engine and de-activates the heat generator.

28 Claims, 6 Drawing Sheets

AUTOMOTIVE HEATER APPARATUS

BACKGROUND OF THE INVENTION

The present invention relates to automotive heater systems employing heat generators that use viscous fluid to generate heat.

Heater systems are installed in automobiles to warm the passenger compartment. A heater system generally has a heater core, which is normally connected to the water jacket of an engine through a coolant circuit. The engine serves as a heat source in the heater system. When engine coolant passes through the water jacket, heat transfer occurs between the coolant and the engine. This cools the engine and heats the engine coolant. The heat carried by the engine coolant is then used to warm the passenger compartment with the heater core. However, much time is required to warm the passenger compartment, especially, when the engine is started when it is cold. Thus, heat generators serving as auxiliary heat sources have been proposed.

U.S. Pat. No. 4,993,377 describes a typical heat generator that assists the engine to heat engine coolant. The heat generator includes a housing, a viscous fluid (e.g., silicone oil) contained in the housing, and a uniquely designed rotor. The rotor, which is fixed to a drive shaft, is rotated to shear the viscous fluid and generate heat. The drive shaft is connected to an electromagnetic clutch. The electromagnetic clutch has a pulley that is connected to the engine by a belt. The drive shaft and the engine are selectively connected to and disconnected from each other by the electromagnetic clutch. A coolant circuit, through which the engine coolant flows, extends between the engine and the heat generator. The heat generated by the engine and the heat generator is carried by the engine coolant and used to warm the passenger compartment.

The heat generator is controlled by a controller (e.g., electronic control unit). The controller excites the electromagnetic clutch and rotates the drive shaft and the rotor with the power of the engine to activate the heat generator. The heat generator is kept activated until the temperature of the engine coolant flowing through the coolant circuit exceeds a predetermined limit temperature, that is, until there is no need for the heat generator to further heat the engine coolant. If the engine coolant temperature exceeds the predetermined limit, the controller de-excites the electromagnetic clutch and disconnects the heat generator from the engine. In this state, the engine sufficiently warms the engine coolant and thus the passenger compartment without assistance from the heat generator.

The temperature of the viscous fluid in the heat generator normally increases as the rotating speed of the rotor, or the engine speed, increases. However, viscous fluid becomes vulnerable to thermal deterioration, which is caused by heat, and mechanical deterioration, which is caused by shearing, as the temperature of the viscous fluid exceeds a certain value. For example, when using high-viscosity silicone oil as the viscous fluid, the silicone oil becomes vulnerable to deterioration if the oil is continuously sheared at a temperature, that exceed a maximum heat-generating temperature of 200° C. Such deterioration decreases the heating efficiency of the silicone oil when sheared by the rotor. This further degrades the heating performance of the heat generator and decreases the efficiency of warming the passenger compartment.

Therefore, the prior art heat generator excites and de-excites the electromagnetic clutch in accordance with the temperature of the engine coolant. Accordingly, the silicone oil in the heat generator is continuously sheared by the rotor until the temperature of the engine coolant reaches the predetermined limit, or de-exciting temperature. However, time is required for the heat of the silicone oil to warm the engine coolant to the de-exciting temperature. Thus, the rotor may continue to rotate at high speeds (e.g., 6,000 rpm to 8,000 rpm) even though the silicone oil has exceeded the recommended maximum heat-generating temperature. This leads to early deterioration of the silicone oil.

To solve this problem, the electromagnetic clutch can be controlled such that it is de-excited when the rotating speed of the rotor or the engine speed exceeds a predetermined fixed threshold value. The rotating speed that heats the silicone oil to its maximum heat-generating temperature is selected as the threshold value.

However, there are cases in which the temperatures of the silicone oil and the engine coolant are both low. In such cases, it is desirable that the silicone oil be heated quickly by increasing the rotating speed of the rotor to produce a large amount of heat within a short period of time. Therefore, if the rotating speed of the rotor is limited to the threshold value, the heat generator may not be able to meet this demand.

SUMMARY OF THE INVENTION

Accordingly, it is an objective of the present invention to provide a viscous fluid heat generator that prevents deterioration of the viscous fluid and maintains a superior heating capability while improving the response of the heat generator to a demand for heat.

To achieve the above objective, the present invention provides a heater apparatus including a fluid circuit for cooling a first heat source, a first fluid circulating through the circuit, a second heat source for transferring heat to the first fluid, and a heater core for transferring heat from the first fluid. The second heat source houses a second fluid and a rotor selectively connected to and disconnected from the first heat source by a clutch. The clutch connects a power source with the rotor to shear the second fluid and generate heat. The heater apparatus includes a temperature sensor for detecting the temperature of the first fluid, a speed sensor for detecting the rotating speed of the rotor, a computer for computing a variable rotating speed limit for the rotor based on the detected first fluid temperature, a memory for storing a first fluid temperature limit, a temperature determiner for determining whether the detected first fluid temperature has exceeded the first fluid temperature limit, a speed determiner for determining whether the detected rotor rotating speed has exceeded the variable rotating speed limit, and a driver for disengaging the clutch to disconnect the rotor from the power source and stop the shearing of the second fluid when the temperature determiner determines that the detected first fluid temperature has exceeded the first fluid temperature limit or when the speed determiner determines that the detected rotor rotating speed has exceeded the variable rotating speed limit.

In a second aspect of the present invention, a control apparatus for controlling an automotive heater apparatus is provided. The heater apparatus includes a coolant circuit for cooling an engine, a coolant circulating through the circuit, and a heat generator for transferring heat to the coolant. The heat generator houses a viscous fluid and a rotor selectively connected to and disconnected from the engine by a clutch. The viscous fluid has a maximum heat-generating temperature, which is the maximum temperature value at which the viscous fluid continues to sufficiently generate heat, and a safety-margin temperature set at a value lower than the maximum heat-generating temperature by a safety margin. The clutch connects the engine with the rotor to rotate the rotor, shear the viscous fluid, and generate heat. A heater core transfers heat from the coolant. The apparatus further includes a temperature sensor for detecting the temperature of the coolant, a speed sensor for detecting the rotating speed of the rotor, a computer for computing a variable rotating speed limit for the rotor based on the detected coolant temperature, a memory for storing a coolant temperature limit, a temperature determiner for determining whether the detected coolant temperature has exceeded the coolant temperature limit, a speed determiner for determining whether the detected rotor rotating speed has exceeded the variable rotor speed limit, and a driver for disengaging the clutch to disconnect the rotor from the engine and stop the shearing of the viscous fluid when the temperature determiner determines that the detected coolant temperature has exceeded the coolant temperature limit or when the speed determiner determines that the detected rotating speed has exceeded the variable rotor speed limit.

In a further aspect of the present invention, a method for controlling an automotive heater apparatus is provided. The heater apparatus includes a coolant circuit for cooling an engine, a coolant circulating through the circuit, a heat generator for heating the coolant, and a heater core for transferring heat from the coolant. The heat generator houses a viscous fluid and a rotor selectively connected to and disconnected from the engine by a clutch. The clutch connects the engine with the rotor to shear the viscous fluid and generate heat. The method includes detecting the temperature of the coolant, detecting the rotating speed of the rotor, computing a variable rotating speed limit for the rotor based on the detected coolant temperature, comparing the detected coolant temperature with a coolant temperature limit stored in a memory, comparing the detected rotor rotating speed with the variable rotor speed limit, determining whether the detected coolant temperature has exceeded the coolant temperature limit, determining whether the detected rotor rotating speed has exceeded the variable rotor speed limit, and disengaging the clutch to disconnect the rotor from the engine and stop the shearing of the viscous fluid when the detected coolant temperature has exceeded the coolant temperature limit or when the detected rotor rotating speed has exceeded the variable rotor speed limit.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

An automotive heater system according to the present invention will now be described with reference to FIGS. 1 to 5.

Figure 1:
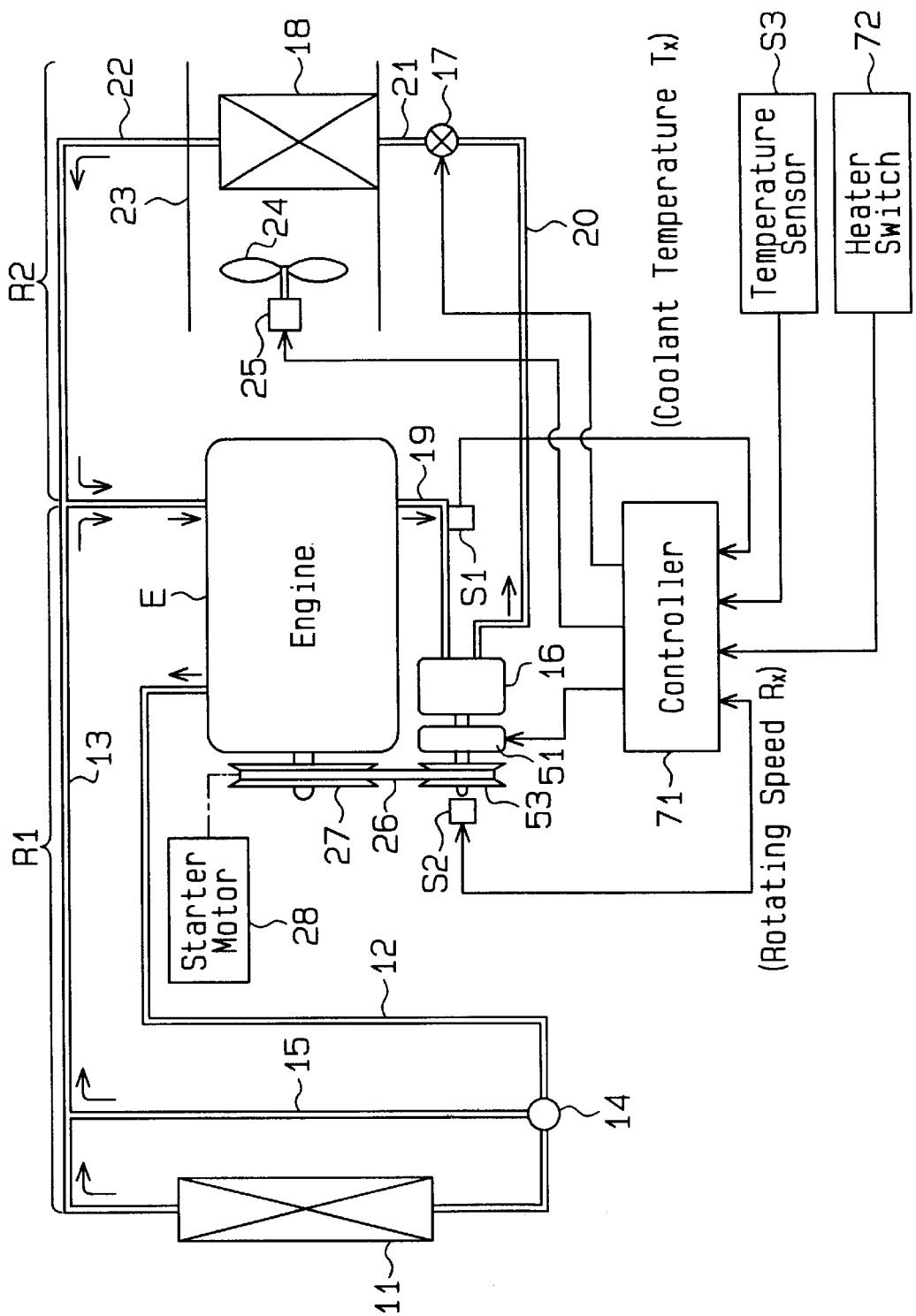
FIG. 1 is a diagrammatic view showing a heater system to which the present invention is applied.

As shown in FIG. 1, the heater system has a coolant circuit. The coolant circuit includes an engine circuit R1 for cooling an engine E (power source), and a heater circuit R2 for warming the passenger compartment. The heater circuit R2 forms part of an air conditioning system (including a heater system), which is installed in an automobile. Fluid circulates through the engine circuit R1 and the heater circuit R2. An antifreeze liquid for cooling the engine, such as ethylene glycol dissolved in water, is used as the circulated fluid.

The engine circuit R1 includes a first pipe 12 and a second pipe 13, which connect the engine E to a radiator 11. A thermostat valve 14 is provided in the first pipe 12. A bypass pipe 15 extending from the radiator thermostat valve 14 is directly connected to the second pipe 13 to bypass the radiator 11. The thermostat valve 14 detects the temperature of the coolant flowing through the first pipe 12. When the coolant temperature is equal to or lower than a predetermined temperature (e.g., 80° C.), the thermostat valve 14 sends the coolant into the bypass pipe 15. When the coolant temperature exceeds the predetermined temperature, the thermostat valve 14 permits the coolant to flow toward the radiator 11. Accordingly, the engine coolant flowing through the engine E and heater circuits R1, R2 is controlled to keep its temperature below the predetermined value.

The heater circuit R2 includes a heat generator 16, an electromagnetic valve 17, and a heater core 18. The heater core 18 transfers heat to the air entering the passenger compartment. The heat generator 16, the electromagnetic valve 17, and the heater core 18 are connected in series by a third pipe 19, a fourth pipe 20, a fifth pipe 21, and a sixth pipe 22. The coolant sent into the third pipe 19 from the engine E flows through the heat generator 16, the electromagnetic valve 17, and the heater core 18 and then returns to the engine E. A coolant temperature sensor S1 is arranged in the third pipe 19, which connects the engine E to the heat generator 16, to detect the temperature of the flowing engine coolant. The heater core 18 is housed in a duct 23 together with a fan 24, which blows air through the heater core 18. The fan 24 is driven by a motor 25. The third, fourth, fifth, and sixth pipes define a circulation passage, part of which is formed by a water jacket (not shown) of the engine E.

The duct 23 also houses other parts of the air conditioning system, such as an evaporator and an air mix door (neither shown). The air current produced by the fan 24 is first cooled by the evaporator, then heated by the heater core 18, and finally sent into the passenger compartment through a duct outlet. The air mix door controls the air current cooled by the evaporator and the air current heated by the heater core 18 to adjust the temperature of the air sent out of the duct outlet.

The electromagnetic valve 17 connects and disconnects the fourth and fifth valves 20, 21 to control the flow of heated engine coolant, which is sent to the heater core 18. This adjusts the temperature of the air entering the passenger compartment.

The heat generator 16 serves as an auxiliary heat source that assists the engine E, or main heat source, to heat the engine coolant. More specifically, the heat generator 16 draws in engine coolant from the engine E through the third pipe 19 and heats the coolant. The heat generator 16 then sends the heated coolant to the heater core 18 through the fourth pipe 20. An electromagnetic clutch 51 operably connects the heat generator 16 to the engine E, which serves as an external power source. The engine E has a crankshaft, to which a drive pulley 27 is secured. A driven pulley 53 is secured to the electromagnetic clutch 51 and connected to a rotor 43, which is housed in the heat generator 16. The drive pulley 27 and the driven pulley 53 are connected to each other by a belt.

A rotating speed sensor S2 is arranged near the electromagnetic clutch 51. The speed sensor S2 detects the rotating speed of the driven pulley 53, which reflects the rotating speed of the rotor 43. Although the speed sensor S2 detects the rotating speed of the driven pulley 53 in the preferred embodiment, the speed sensor S2 may be employed to detect the rotating speed of the drive pulley 27 (i.e., engine speed) instead, as long as there is a known relationship between the rotating speeds of the drive pulley 27 and the rotor 43.

Figure 2:
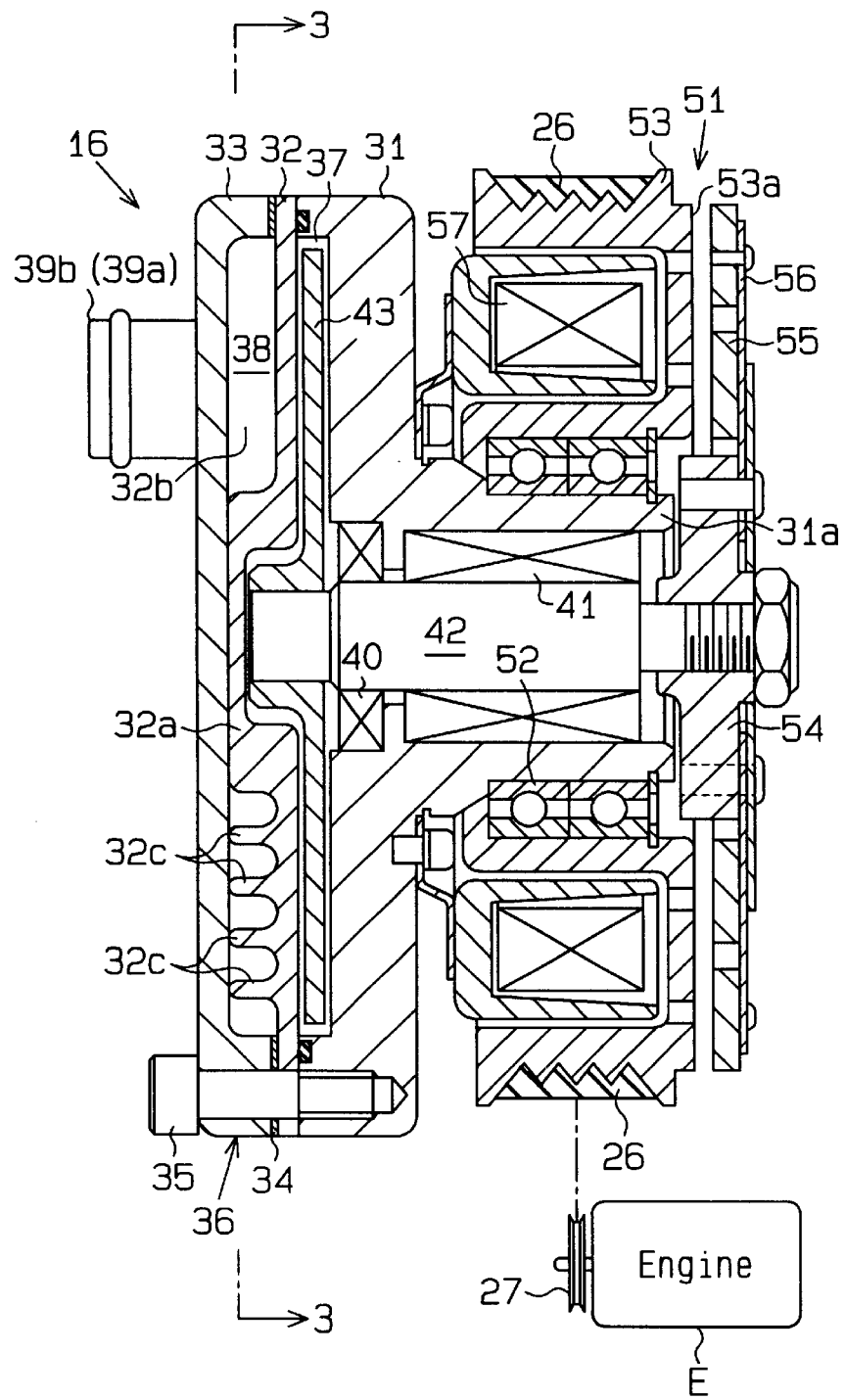
FIG. 2 is a cross-sectional view showing a heat generator with its clutch in a disconnected state.

As shown in FIG. 2, the heat generator has a front housing 31 and a rear housing 36. The term front refers to the right side of FIG. 2, while the term rear refers to the left side of FIG. 2. The rear housing 36 includes an inner body, a partition 32, and an outer body, or cover 33, with a gasket 34 arranged in between. A plurality of bolts 35 fasten the rear housing 36 to the front housing 31.

The front housing 31 has a recess that defines a heating chamber 37 when sealed by the generally flat partition 32. A water jacket 38, which serves as a heat receiving chamber, is defined between the rear surface of the partition 32 and the cover 33. Thus, the water jacket 38 is adjacent to the heating chamber 37. The cover 33 has an inlet 39a, through which engine coolant is drawn into the water jacket 38 from the heater circuit R2, and an outlet 39b, through which engine coolant is sent out to the heater circuit R2 from the water jacket 38.

Figure 3:
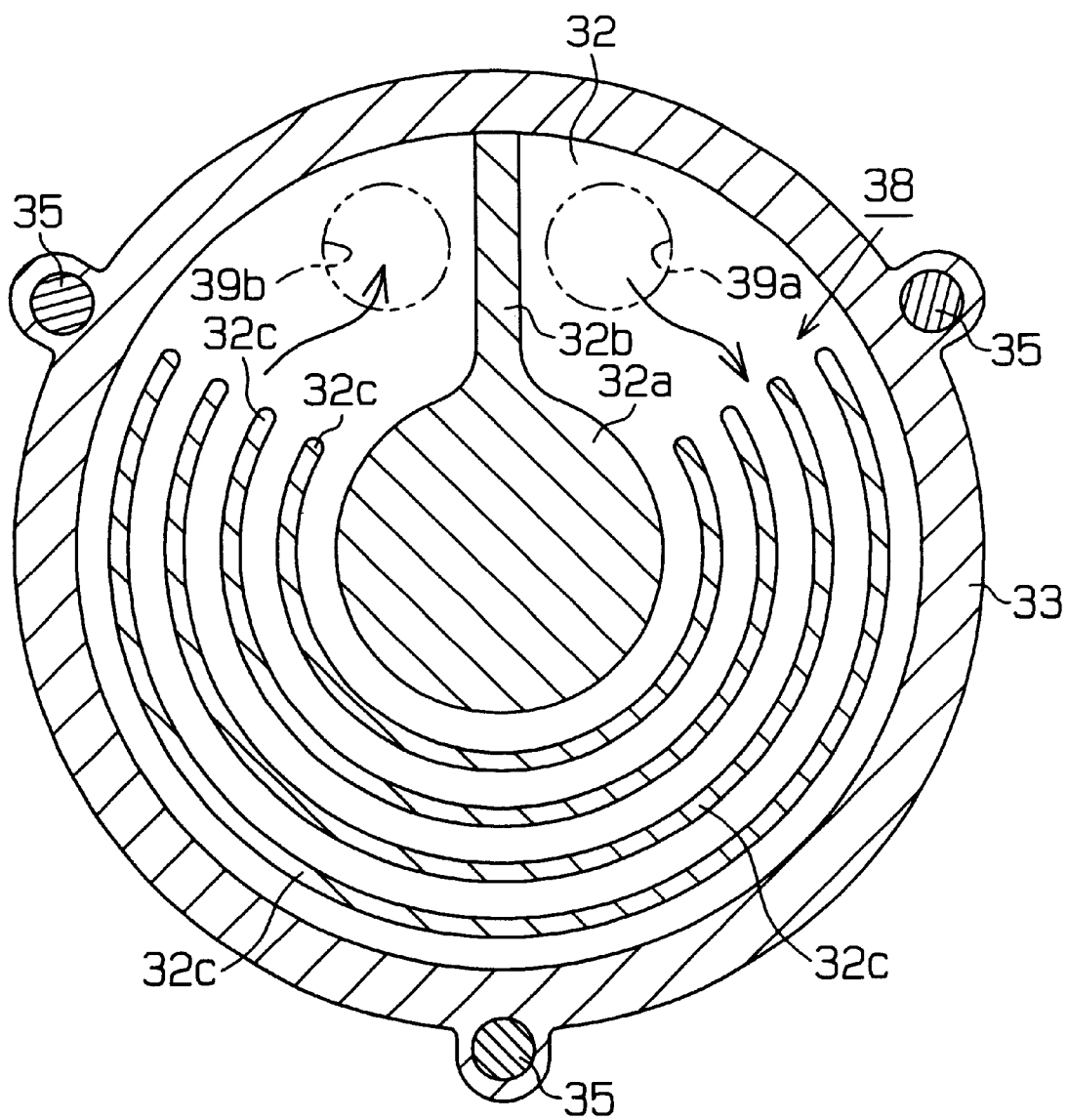
FIG. 3 is a cross-sectional view showing a cross-sectional view taken along line 3—3 in FIG. 2.

As shown in FIGS. 2 and 3, a cylindrical boss 32a projects from the rear center of the partition 32. Furthermore, a wall 32b extends radially upward from the boss 32a along the rear surface of the partition 32 between the inlet port 39a and the outlet port 39b. A plurality of concentric guide fins 32c extend about the boss 32a between the vicinity of the inlet 39a and that of the outlet 39b. The boss 32a, the wall 32b, and the fins 32c are in contact with the inner surface of the cover 33 to form a circulation passage, through which the engine coolant flows, in the water jacket 38.

As shown in FIG. 2, a bearing 41 is arranged in the front housing 31 to rotatably receive a drive shaft 42. A seal (e.g., an oil seal) is fitted on the drive shaft 42 to seal the space between the heating chamber 37 and the bearing 41. The disk-like rotor 43 is fixed to the rear end of the drive shaft 42 and accommodated in the heating chamber 37.

The heating chamber 37 is filled with a viscous fluid, or silicone oil. That is, the space between the inner surface of the heating chamber 37 and the outer surface of the rotor 43 is nearly fully filled with the silicone oil. The viscous fluid is not limited to silicone oil nor is it limited to liquids or semifluids having high viscosity. The viscous fluid can be any type of medium that generates heat when a mechanical force is applied thereto.

A cylinder 31a projects forward from the front housing 31 to support an electromagnetic clutch 51. The electromagnetic clutch 51 includes a driven pulley 53 and a disk-like clutch plate 55. The driven pulley 53 is rotatably supported on the cylinder 31a by an angular bearing 52. A ring 54 is fixed to the front end of the drive shaft 42 to support the clutch plate 55 such that the clutch plate 55 slides along the ring 54 in the axial direction of the drive shaft 42. A leaf spring 56 has a central portion, which is fixed to the ring 54, and a peripheral portion, which is coupled to the peripheral portion of the clutch plate 55 by rivets or the like. The driven pulley 53 has a face 53a that opposes the clutch plate 55 and functions as an another clutch plate.

The driven pulley 53 is operably connected to the engine E by a belt 26. A solenoid coil 57 is arranged in the driven pulley 53 to apply electromagnetic force to the clutch plate 55 through the pulley face 53a.

As shown in FIG. 1, a controller 71 is provided in the heater system. The controller 71 is a control unit, similar to a microcomputer, that incorporates a central processing unit (CPU), a read only memory (ROM), a random access memory (RAM), and an input/output interface (none of which are shown). Furthermore, the controller 71 serves as a computer, a memory, a temperature determiner, a speed determiner, and a driver. Various programs, such as programs for controlling the electromagnetic valve 17, the fan motor 25, and the electromagnetic clutch 51, are stored in the ROM.

The input side of the controller 71 is connected to the coolant temperature sensor S1 and the rotating speed sensor S2. A temperature sensor S3 and a heater switch 72 are also connected to the controller 71. If necessary, a fluid temperature sensor for detecting the temperature of the viscous fluid in the heating chamber 37 may also be connected to the controller 71. The temperature sensor S3 detects the temperature of the passenger compartment and the temperature outside the automobile. The heater switch 72 is arranged on an instrument panel so that a passenger can activate or de-activate the heater system. The heater switch 72 is also used to select the desirable passenger compartment temperature. The output side of the controller 71 is connected to the electromagnetic valve 17, the fan motor 25, and the electromagnetic clutch 51.

The operation of the heater system will now be described. When the engine E is started, the belt 26 transmits the engine torque from the drive pulley 27 to the driven pulley 53. If the engine E is started by a starter motor 28, the controller 71 keeps the solenoid coil 57 of the electromagnetic clutch 55 de-excited regardless of whether the heater switch 72 is turned on or off to avoid unnecessary load to the starter motor 28. Thus, the heat generator 16 (auxiliary heat source) does not function during this period since power is not transmitted to the heat generator 16 from the engine E. The controller 71 continues to keep the electromagnetic clutch 51 disconnected from the engine E even after the engine E starts and begins to idle as long as the heater switch 72 is turned off.

When the heater switch 72 is turned on while the engine E is operating, the controller 71 opens the electromagnetic valve 17 and feeds current to the fan motor 25 to drive the fan 24. The controller 71 further feeds current to the solenoid coil 57 of the electromagnetic clutch 51 to generate heat with the heat generator 16. More specifically, the controller 71 excites the solenoid coil 57 to produce an electromagnetic force that attracts the clutch plate 55 toward the pulley face 53a against the force of the leaf spring 56. This abuts the clutch plate 55 against the pulley face 53a. The friction between the clutch plate 55 and the pulley 53 transmits the rotation of the pulley 53 to the drive shaft 42 by way of the clutch plate 55 and the ring 54. This rotates the rotor 43. The rotation of the rotor 43 shears the silicone oil occupying the clearance between the inner surface of the heating chamber 37 and the outer surface of the rotor 43 and thus generates heat. The heat is then transferred through the partition 32 to the engine coolant flowing through the water jacket 38.

The engine coolant, which is heated while circulating through the water jacket 38, is sent to the heater core 18 by way of the fourth pipe 20 and the electromagnetic valve 17. When the engine coolant passes through the heater core 18, heat is convected into the air current produced by the fan 24. This heats the air and warms the passenger compartment. The engine coolant, from which heat has been removed in the heater core 18, then flows through the sixth pipe 22 and returns to the engine E.

Figure 4:
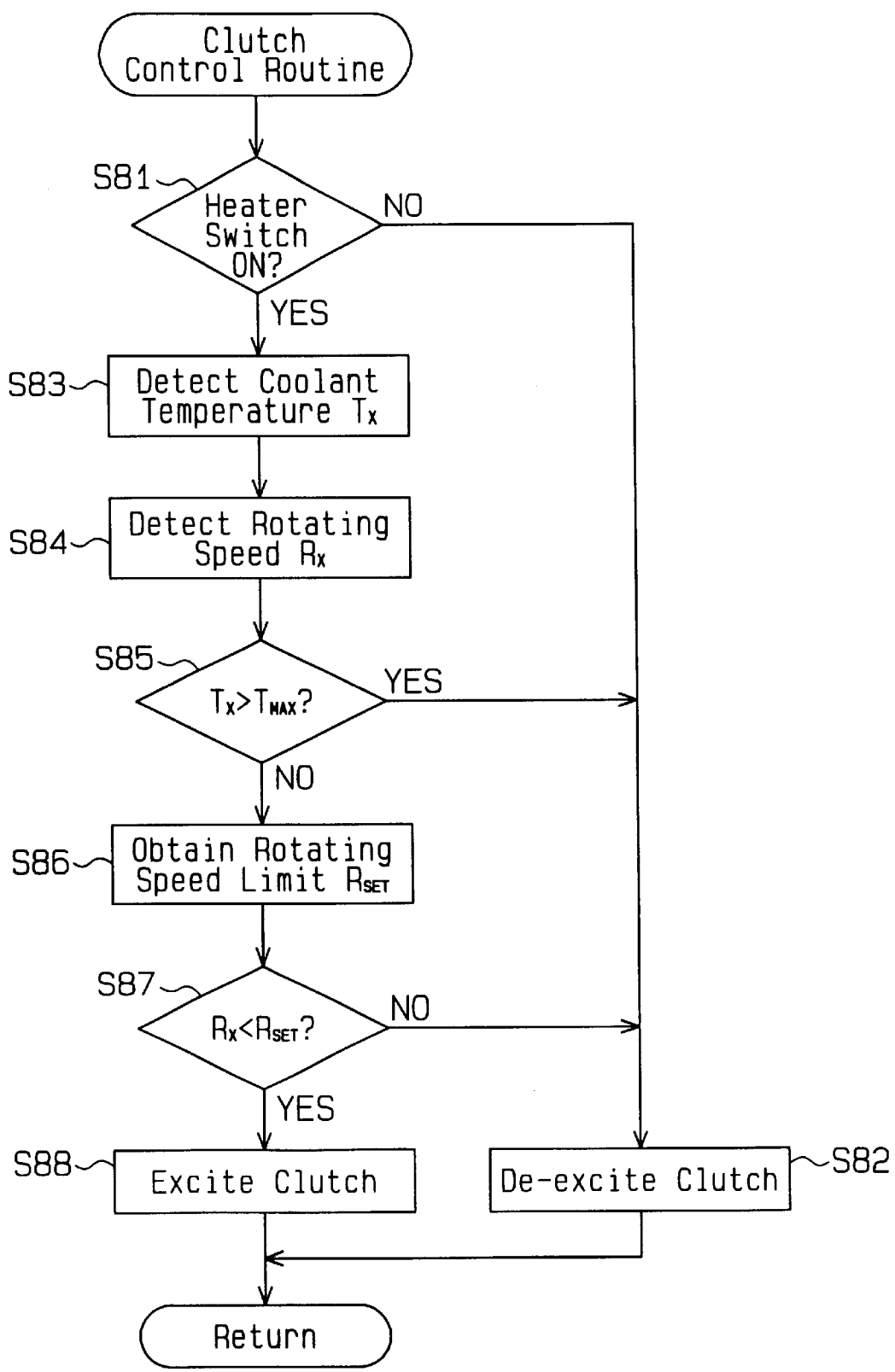
FIG. 4 is a flowchart showing a routine for controlling the electromagnetic clutch.

During operation of the engine E, the electromagnetic clutch 51 is controlled by a routine such as that illustrated in the flowchart of FIG. 4. This routine is executed in an interrupting and cyclic manner (e.g., every 100 milliseconds).

When entering the routine, the controller 71 first performs step S81 and judges whether the heater switch 72 is turned on. If it is determined that the heater switch 72 is turned off, this indicates that the passenger compartment need not be warmed. In this case, the controller 71 proceeds to step S82 and de-excites the electromagnetic clutch 51. In this state, the heat generator 16 is disconnected from the engine E. Thus, the heat generator 16 does not generate heat.

If it is determined that the heater switch 72 is turned on in step S81, this indicates that the passenger compartment requires warming. Thus, the controller 71 proceeds to step S83 and obtains the temperature $T_X$ of the engine coolant through the data sent from the coolant temperature sensor S1. At step S84, the controller obtains the rotating speed $R_X$ of the driven pulley 53 or the rotor 43 through the data sent from the rotating speed sensor S2.

At step S85, the controller 71 determines whether the present engine coolant temperature $T_x$ has exceeded the predetermined maximum temperature $T_{MAX}$ (e.g., 80° C.), which is a fixed threshold value for determining whether or not to continue the transmission of power from the engine E to the rotor 43. If it is determined that the engine coolant temperature $T_X$ is higher than the maximum temperature $T_{MAX}$, the controller 71 proceeds to step S82 and stops feeding current to the solenoid coil 57 of the electromagnetic clutch 51. This terminates the generation of heat by the heat generator 16. Accordingly, the radiator thermostat valve 14 sends the engine coolant toward the radiator 11 to be cooled when the engine coolant temperature $T_X$ exceeds the maximum temperature $T_{MAX}$.

If it is determined that the engine coolant temperature $T_X$ is equal to or lower than the maximum temperature $T_{MAX}$ in step S85, the controller 71 proceeds to step S86. At step S86, the controller 71 refers to the graph, or map, shown in FIG. 5 to obtain a rotating speed limit $R_{SET}$, which is a variable threshold value for determining whether or not to continue the transmission of power from the engine E to the rotor 43. The graph of FIG. 5 may instead be represented by a formula stored in the controller 71.

At step S87, the controller 71 judges whether the rotating speed $R_X$ of the driven pulley 53 or the rotor 43, which was obtained in step S84, is lower than the rotating speed limit $R_{SET}$, which was obtained in step S86. If it is determined that the rotating speed $R_X$ is equal to or higher than the rotating speed limit $R_{SET}$, the controller 71 proceeds to step S82 and stops feeding current to the solenoid coil 57 of the electromagnetic clutch 51. This terminates the generation of heat by the heat generator 16.

If it is determined that the rotating speed $R_X$ is lower than the rotating speed limit $R_{SET}$, the controller 71 proceeds to step S88 and continues to feed current to the solenoid coil 57 of the electromagnetic clutch 51. In this state, the heat generator 16 continues heat generation.

Figure 5:
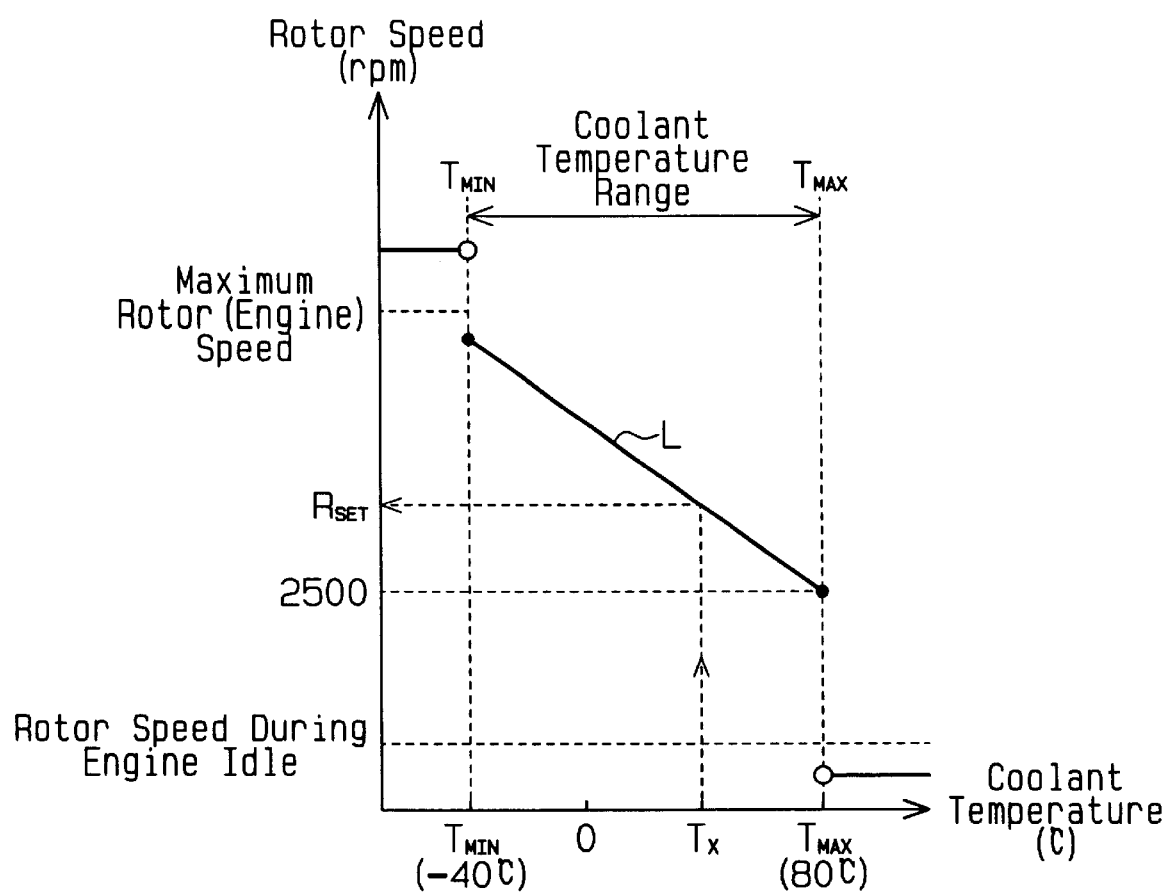
FIG. 5 is a graph showing the relationship between the engine coolant temperature and the disconnecting speed of the electromagnetic clutch.

The two-dimensional map of FIG. 5 is stored as digital data in the ROM or RAM, which are incorporated in the controller 71. In the map of FIG. 5, the maximum temperature $T_{MAX}$ of the engine coolant is selected at 80° C. since the radiator thermostat valve 14 is set such that the radiator 11 starts functioning at about 80° C.

As shown in FIG. 5, the rotating speed limit $R_{SET}$ is set at 2,500 rpm when the engine coolant temperature $T_X$ becomes equal to the maximum temperature $T_{MAX}$. Experiments have confirmed that the temperature of the silicone oil in the heating chamber 37 rises to 200° C. when the rotor 43 rotates at about 2,500 rpm. In other words, the temperature of the silicone oil remains lower than 200° C. as long as the rotating speed of the rotor 43 is equal to or lower than 2,500 rpm even if the engine coolant temperature $T_X$ is equal to the maximum temperature $T_{MAX}$.

The rotating speed limit $R_{SET}$ is set at a value that is close to the maximum engine speed when the engine coolant temperature $T_X$ is equal to a predetermined minimum temperature TMIN (e.g., −40° C.). When the temperature of the engine coolant is relatively low, much time is required before the temperature of the silicone oil reaches 200° C. even if the rotor 43 rotates at a high speed. This is because a large amount of heat is conducted into the water jacket 38 from the heating chamber 37. Thus, the rotor 43 is permitted to rotate at a high speed under such conditions.

In FIG. 5, the characteristic line L, which extends through the coolant temperature range ($T_{MIN}$ to $T_{MAX}$), is plotted to indicate the rotor rotating speeds that are required to heat the silicone oil to a temperature of 200° C.

The silicone oil can actually be heated to a temperature that is higher than 200° C. and still generate heat. In other words, the value of 200° C. includes a safety margin and is lower than the actual maximum heat-generating temperature. The margin provided between the maximum heat-generating temperature and the safety-margin temperature prevents problems caused by overshooting, which sometimes occurs during temperature feedback control.

Figure 6:
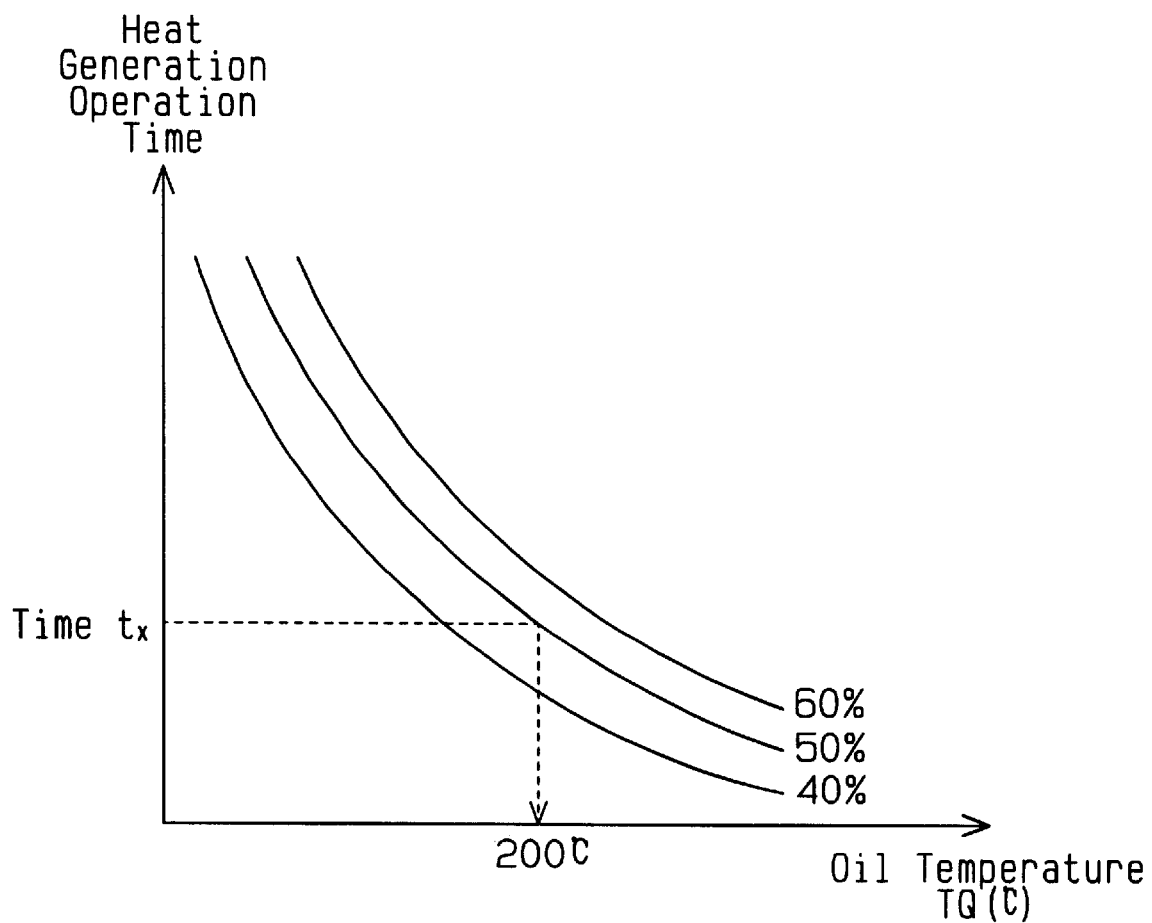
FIG. 6 is a graph showing the relationship between the operating time of the heat generator and the initial temperature of the viscous fluid with respect to different heating value decrease rates.

The temperature value of 200° C. is determined in accordance with the presumed usage period of the heat generator 16 (i.e., guaranteed period). FIG. 6 illustrates a graph indicating the presumed (initial) relationship between the operating time of a heat generator and the temperature to which the silicone oil heats. Each curve represents different target decrease rates Q(%) of the heating value. The decrease rate Q is calculated from equation (1).

$$Q = \left(\frac{Q_0 - Q_t}{Q_0}\right) \times 100[\%] \quad (1)$$

In equation (1), $Q_o$ represents the initial heating value of the silicone oil, when the heat generator 16 is first used. $Q_t$ represents the heating value of the silicone oil when the heat generator 16 has been used for a total usage time t. If the present heating value is the same as the initial heat value ($Q_t=Q_o$), the heating value decrease rate Q is zero percent. Such state is ideal in that a decrease in the heating value does not occur. However, a decrease in the heating value cannot be avoided due to deterioration of the silicone oil.

The curves in the graph of FIG. 6 represent the relationship between the oil temperature and the operating time of the heat generator when the heating value decrease rate is presumed at 40%, 50%, and 60%. If the guaranteed period of the heat generator 16 is time $t_x$ and the target decrease rate Q is 50%, the silicone oil is presumed to be able to rise to a temperature of 200° C. when the guaranteed period ends. The safety-margin temperature of 200° C. is determined in this manner.

In the preferred and illustrated embodiment, the controller 71 controls the electromagnetic clutch 51 of the heat generator 16 based on the relationship between the clutch rotating speed limit $R_{SET}$, which corresponds to the engine coolant temperature $T_X$, and the rotating speed $R_X$ of the rotor 43 (or driven pulley 53) The present invention differs from the prior art in that the electromagnetic clutch 51 is controlled by both engine coolant temperature $T_X$ and rotor speed $R_X$. Accordingly, the silicone oil is sheared only when the rotating speed $R_X$ is lower than the deactivating speed, or the rotating speed limit $R_{SET}$. This prevents overheating of the silicone oil and delays deterioration.

In the preferred and illustrated embodiment, a fixed rotor speed threshold value is not used to determine whether the electromagnetic clutch 51 is to be de-excited. The electromagnetic clutch 51 is de-activated when the rotor (pulley) rotating speed $R_X$ reaches the variable rotating speed limit $R_{SET}$, which is set to increase as the temperature of the engine coolant decreases in a proportional manner. Accordingly, if the temperature of the engine coolant is low, the rotor 43 is permitted to rotate at a higher speed due to the higher rotating speed limit $R_{SET}$. Thus, the heat generator 16 readily generates heat when activated.

The controller 71 controls the electromagnetic clutch 51 based on the maximum temperature $T_{MAX}$ of the engine coolant. Thus, heat generation is stopped when the engine coolant temperature exceeds the fixed threshold value, or the maximum temperature $T_{MAX}$. This delays the deterioration of the silicone oil.

It should be apparent to those skilled in the art that the present invention may be embodied in many other specific forms without departing from the spirit or scope of the invention.

For example, in the preferred and illustrated embodiment, the present invention is applied to a heat generator that employs a rotor to generate heat with silicone oil. However, the present invention may also be applied to a gear type or hydraulic type heat generator. In such heat generators, viscous fluid is heated by actuating a gear pump or hydraulic pump. Such structure has the same advantages as the preferred embodiment.

Therefore, the present examples and embodiments are to be considered as illustrative and not restrictive, and the invention is not to be limited to the details given herein, but may be modified within the scope and equivalence of the appended claims.

What is claimed is:

1. A heater apparatus comprising a first heat source, a fluid circuit for circulating a first fluid for cooling the first heat source, a second heat source for transferring heat to the first fluid, the second heat source for housing a second fluid, a rotor rotatably supported within the second heat source for being selectively connected to and disconnected from the first heat source by a clutch, the clutch for connecting a power source with the rotor to cause the rotation of the rotor to shear the second fluid and generate heat, and a heater core for transferring heat from the first fluid, the heater apparatus further comprising:

a temperature sensor for detecting the temperature of the first fluid;

a speed sensor for detecting the rotating speed of the rotor;

a controller for computing a variable rotating speed limit for the rotor based on the detected first fluid temperature;

a memory for storing a first fluid temperature limit;

a temperature determiner for determining whether the detected first fluid temperature has exceeded the first fluid temperature limit;

a speed determiner for determining whether the detected rotor rotating speed has exceeded the variable rotating speed limit; and a driver for disengaging the clutch to disconnect the rotor from the power source and stop the shearing of the second fluid, wherein the driver disengages the clutch when the temperature determiner determines that the detected first fluid temperature has exceeded the first fluid temperature limit and the driver disengages the clutch when the speed determiner determines that the detected rotor rotating speed has exceeded the variable rotating speed limit.

2. The heater apparatus according to claim 1, wherein the controller stores information for computing a variable rotating speed limit inversely proportional to the first fluid temperature.

3. The heater apparatus according to claim 2, wherein the information is a two-dimensional map that represents a predetermined relationship between the coolant temperature and the rotor rotating speed.

4. The heater apparatus according to claim 3, wherein the second fluid has a maximum heat-generating temperature, which is the maximum temperature value at which the second fluid continues to sufficiently generate heat, and a safety-margin temperature, which is set lower than the maximum heat-generating temperature by a safety margin, and wherein the computer determines the variable rotating speed limit to. permit the rotor to shear and heat the second fluid to the safety-margin temperature.

5. The heater apparatus according to claim 4, wherein the safety-margin temperature is predetermined to maintain deterioration of the second fluid within a predetermined range.

6. The heater apparatus according to claim 2, wherein the information is a formula that represents a predetermined relationship between the coolant temperature and the rotor rotating speed.

7. The heater apparatus according to claim 1, wherein the second fluid includes a viscous fluid.

8. The heater apparatus according to claim 1, wherein the second heat source includes a heating chamber for accommodating the second fluid and the rotor, and a heat receiving chamber located adjacent to the heating chamber, the heat receiving chamber forming part of the fluid circuit.

9. A control apparatus for controlling an automotive heater apparatus, wherein the heater apparatus includes a coolant circuit for circulating a coolant for cooling an engine, a heat generator for transferring heat to the coolant circulating through the coolant circuit, the heat generator for housing a viscous fluid and a rotor within the heat generator, wherein the rotor may be selectively connected to and disconnected from the engine by a clutch, the viscous fluid having a maximum heat-generating temperature, which is the maximum temperature value at which the viscous fluid continues to sufficiently generate heat, and a safety-margin temperature set at a value lower than the maximum heat-generating temperature by a safety margin, the clutch for connecting the engine with the rotor to rotate the rotor, shear the viscous fluid and generate heat, and a heater core for transferring heat from the coolant, the control apparatus comprising:

a temperature sensor for detecting the temperature of the coolant;

a speed sensor for detecting the rotating speed of the rotor;

a controller for computing a variable rotating speed limit for the rotor based on the detected coolant temperature;

a memory for storing a coolant temperature limit;

a temperature determiner for determining whether the detected coolant temperature has exceeded the coolant temperature limit;

a speed determiner for determining whether the detected rotor rotating speed has exceeded the variable rotor speed limit; and a driver for disengaging the clutch to disconnect the rotor from the engine and stop the shearing of the viscous fluid, wherein the driver disengages the clutch when the temperature determiner determines that the detected coolant temperature has exceeded the coolant temperature limit and the driver disengages the clutch when the speed determiner determines that the detected rotating speed has exceeded the variable rotor speed limit.

10. The control apparatus according to claim 9, wherein the controller stores information for computing a variable rotating speed limit inversely proportional to the coolant temperature.

11. The control apparatus according to claim 10, wherein the information is a two-dimensional map that represents a predetermined relationship between the coolant temperature and the rotor rotating speed.

12. The control apparatus according to claim 11, wherein the controller computes the variable rotor speed limit to permit the rotor to shear and heat the viscous fluid to the safety-margin temperature.

13. The control apparatus according to claim 12, wherein the safety-margin temperature is predetermined to maintain deterioration of the viscous fluid within a predetermined range.

14. The control apparatus according to claim 10, wherein the information is a formula that represents a predetermined relationship between the coolant temperature and the rotor rotating speed.

15. A method for controlling an automotive heater apparatus, wherein the heater apparatus includes a coolant circuit for cooling an engine, a coolant circulating through the circuit, a heat generator for heating the coolant, the heat generator housing a viscous fluid and a rotor selectively connected to and disconnected from the engine by a clutch, the clutch connecting the engine with the rotor to shear the viscous fluid and generate heat, and a heater core for transferring heat from the coolant, the method comprising:

detecting the temperature of the coolant;

detecting the rotating speed of the rotor;

computing a variable rotating speed limit for the rotor based on the detected coolant temperature;

comparing the detected coolant temperature with a coolant temperature limit stored in a memory;

comparing the detected rotor rotating speed with the variable rotor speed limit;

determining whether the detected coolant temperature has exceeded the coolant temperature limit;

determining whether the detected rotor rotating speed has exceeded the variable rotor speed limit; and disengaging the clutch to disconnect the rotor from the engine and stop the shearing of the viscous fluid when either one of the detected coolant temperature has exceeded the coolant temperature limit and the detected rotor rotating speed has exceeded the variable rotor speed limit.

16. The method according to claim 15 further comprising determining the variable rotor speed limit to be inversely proportional to the coolant temperature.

17. The method according to claim 16, further comprising referring to a data map that represents a predetermined relationship between the coolant temperature and the rotor rotating speed when computing the variable rotating speed limit.

18. The method according to claim 17 further comprising determining the variable rotating speed limit to permit the rotor to heat the viscous fluid to a safety-margin temperature, which is lower than an actual maximum heat generating temperature of the viscous fluid.

19. The method according to claim 18 further comprising predetermining the safety-margin temperature to maintain deterioration of the viscous fluid within a predetermined range.

20. The method according to claim 16, further comprising referring to a formula that represents a predetermined relationship between the coolant temperature and the rotor rotating speed when computing the variable rotating speed limit.

21. A controller for controlling rotation of a rotor of a viscous heater, wherein rotation of the rotor causes shearing of a first, viscous fluid to generate heat and a second fluid circulating through the viscous heater is heated by the generated heat, the controller comprising:

an input for data indicative of the temperature of the second fluid; and an input for data indicative of the rotating speed of the rotor;

the controller being programmed to:

compare the rotating speed of the rotor to a rotating speed limit:

limit rotation of the rotor when the rotating speed of the rotor has exceeded the rotating speed limit;

compare the temperature of the second fluid to a temperature limit; and limit rotation of the rotor when the temperature of the second fluid has exceeded a temperature limit.

22. The controller of claim 21, wherein the controller is further programmed to compute the rotating speed limit based on the temperature of the second fluid.

23. A heating system comprising:

a viscous heater having a chamber for containing a first, viscous fluid;

a rotor rotatably supported within the chamber, wherein rotation of the rotor causes shearing of the first, viscous fluid, generating heat;

a fluid circuit through the viscous heater for circulating a second fluid to be heated by the generated heat;

a temperature sensor for detecting the temperature of the second fluid;

a speed sensor for detecting the rotating speed of the rotor;

a controller for controlling rotation of the rotor, the controller being programmed to:

compare the rotating speed of the rotor to a rotating speed limit;

limit rotation of the rotor when the rotating speed of the rotor has exceeded the rotating speed limit;

compare the temperature of the second fluid to a temperature limit; and limit rotation of the rotor when the temperature of the second fluid has exceeded a temperature limit.

24. The heating system of claim 23, wherein the controller is further programmed to compute the rotating speed limit based on the temperature of the second fluid.

25. A control system for controlling a viscous heater, the viscous heater having a circulating fluid circulating therethrough, a viscous fluid and a rotatable rotor for shearing the viscous fluid to generate heat to heat the circulating fluid, the control system comprising:

a temperature sensor for detecting the temperature of the circulating fluid;

a speed sensor for detecting the rotating speed of the rotor; and a controller for controlling rotation of the rotor, the controller being programmed to:

compare the rotating speed of the rotor to a rotating speed limit;

limit rotation of the rotor when the rotating speed of the rotor has exceeded the rotating speed limit;

compare the temperature of the second fluid to a temperature limit; and limit rotation of the rotor when the temperature of the second fluid has exceeded a temperature limit.

26. The control system of claim 25, wherein the controller is further programmed to compute the rotating speed limit based on the temperature of the second fluid.

27. A method for controlling operation of a viscous heater, the viscous heater comprising a chamber, a rotor rotatably supported within the chamber for shearing a viscous fluid within the chamber, and a coolant circulating through the viscous heater for being heated by heat generated by shearing of the viscous fluid, the method comprising:

detecting the temperature of the coolant;

detecting the rotating speed of the rotor;

comparing the rotating speed of the rotor to a speed limit:

comparing the coolant temperature to a temperature limit; and limiting rotation of the rotor when either one of the detected coolant temperature has exceeded a coolant temperature limit and the detected rotor rotating speed has exceeded the variable rotor speed limit.

28. The method of claim 27, further comprising computing the speed limit based on the temperature of the coolant.

* * * * *

UNITED STATES PATENT AND TRADEMARK OFFICE
CERTIFICATE OF CORRECTION

PATENT NO. : 6,244,232 B1
DATED : June 12, 2001
INVENTOR(S) : Takashi Ban et al.

It is certified that error appears in the above-identified patent and that said Letters Patent is hereby corrected as shown below:

Column 10,
Line 37, please change "limit to. permit" to -- limit to permit --.

Signed and Sealed this

Ninth Day of April, 2002

JAMES E. ROGAN
Director of the United States Patent and Trademark Office

Attest:

Attesting Officer